US010223171B2

(12) United States Patent
Labasan et al.

(10) Patent No.: US 10,223,171 B2
(45) Date of Patent: Mar. 5, 2019

(54) MITIGATING LOAD IMBALANCES THROUGH HIERARCHICAL PERFORMANCE BALANCING

(71) Applicant: Intel Corporation, Santa Clara, CA (US)

(72) Inventors: Stephanie Labasan, Portland, OR (US); Federico Ardanaz, Hillsboro, OR (US); Jonathan M. Eastep, Portland, OR (US); Richard J. Greco, West Linn, OR (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 15/081,424

(22) Filed: Mar. 25, 2016

(65) Prior Publication Data

US 2017/0277576 A1 Sep. 28, 2017

(51) Int. Cl.
*G06F 9/50* (2006.01)

(52) U.S. Cl.
CPC .................................. *G06F 9/5083* (2013.01)

(58) Field of Classification Search
None
See application file for complete search history.

(56) References Cited

U.S. PATENT DOCUMENTS

| | | | |
|---|---|---|---|
| 2007/0250837 A1 | 10/2007 | Herington et al. | |
| 2009/0100248 A1 | 4/2009 | Kami | |
| 2011/0067029 A1* | 3/2011 | Wolfe | G06F 9/505 718/102 |
| 2013/0055279 A1 | 2/2013 | Sistare | |
| 2013/0159910 A1* | 6/2013 | Bostic | G06F 11/3048 715/772 |
| 2014/0282589 A1 | 9/2014 | Dawson et al. | |
| 2014/0380338 A1* | 12/2014 | Makovsky | G06F 9/542 719/318 |
| 2015/0039767 A1 | 2/2015 | Matczynski et al. | |
| 2015/0067356 A1* | 3/2015 | Trichy Ravi | G06F 1/324 713/300 |

OTHER PUBLICATIONS

Jonathan M. Eastep et al., "Dynamic Hierarchical Performance Balancing of Computational Resources", U.S. Appl. No. 14/583,237, filed Dec. 26, 2014, 50 pages, United States Patent and Trademark Office.
International Search Report and Written Opinion for International Patent Application No. PCT/US2017/018705, dated Dec. 4, 2017, 15 pages.
International Preliminary Report on Patentability for International Patent Application No. PCT/US2017/018705, dated Oct. 4, 2018, 12 pages.

* cited by examiner

*Primary Examiner* — Sisley N Kim
(74) *Attorney, Agent, or Firm* — Jordan IP Law, LLC

(57) ABSTRACT

Systems, apparatuses and methods may provide for obtaining, by a system level reallocator in a plurality of reallocators arranged in a hierarchical tree, resource budget information. Additionally, application performance information may be obtained by at least one of the plurality of reallocators. Moreover, a performance imbalance between a plurality of compute subtrees associate with the application performance information may be reduced by the at least one of the plurality of reallocators and based at least in part on the resource budget information and the application performance information.

24 Claims, 4 Drawing Sheets ions may be mitigated by allocating different amounts of the resource budget to the first node level reallocator 16a than to the second node level reallocator 16b (e.g., rather than indiscriminately allocating equal amounts regardless of the performance imbalance). Moreover, the imbalance mitigation may take place at any or all levels of the hierarchical tree.
MITIGATING LOAD IMBALANCES THROUGH HIERARCHICAL PERFORMANCE BALANCING

GOVERNMENT INTEREST STATEMENT

This invention was made with Government support under contract number H98230-13-D-0124 awarded by the Department of Defense. The Government has certain rights in this invention.

TECHNICAL FIELD

Embodiments generally relate to computing load imbalances. More particularly, embodiments relate to mitigating computing load imbalances through hierarchical performance balancing.

BACKGROUND

High performance computing (HPC) solutions may apply a bulk-synchronous computational model to a large number of computing elements (e.g., processor cores) in which each computing element is assigned an approximately equal amount of work associated with one or more applications. At periodic and frequent milestones during the computation, each computing element may globally synchronize with the other computing elements in order to ensure correctness and to exchange data used in the next stage of the computation. A number of factors, however, may lead to load imbalances between the computing elements, wherein the load imbalances may in turn present challenges with regard to global synchronization. For example, manufacturing variations, increases in system scale, complexity of dividing application work into equally sized pieces, jitter induced by operating system (OS) daemons or services, non-uniform memory access (NUMA) latencies and unfairness between on-die interconnect routing protocols may all cause load imbalances that result in computing elements arriving at a particular global synchronization point at different moments in time. Moreover, overall application performance may be determined (and limited) by the last computing element to arrive at a synchronization point. Indeed, the computing elements that arrive early may waste a considerable amount of time and energy waiting at the synchronization point.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
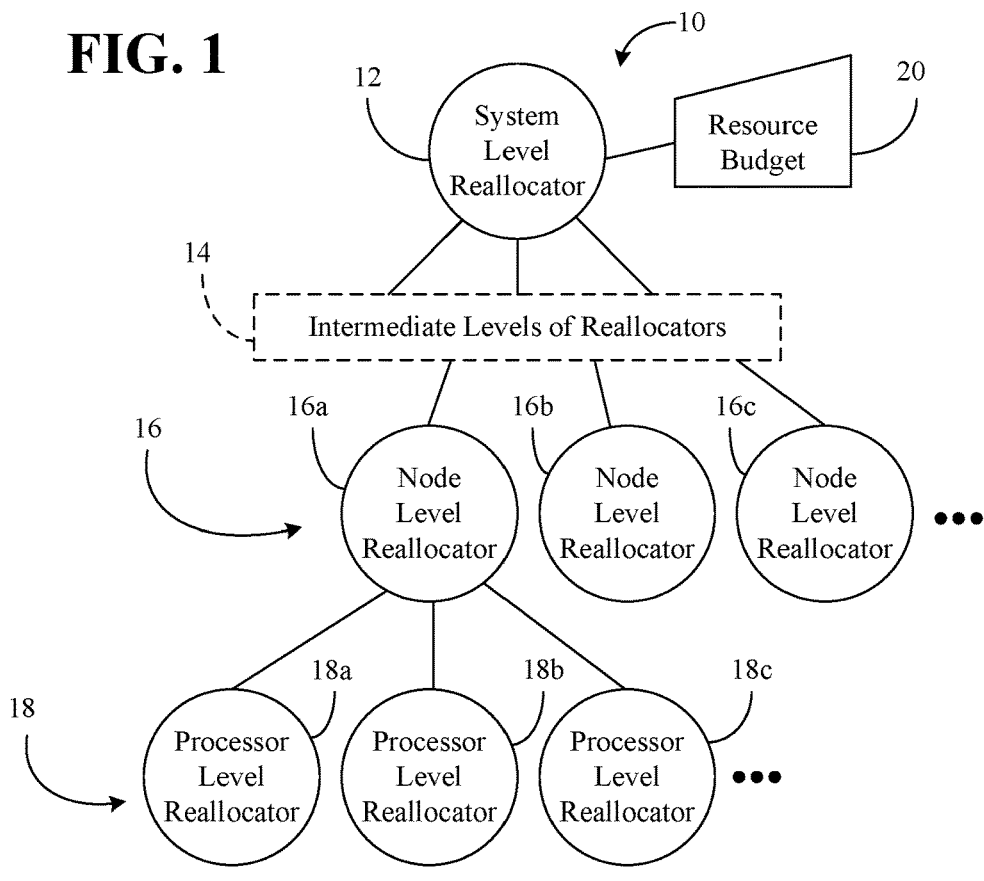
FIG. 1 is a block diagram of an example of a plurality of reallocators arranged in a hierarchical tree according to an embodiment.

Turning now to FIG. 1, a reallocation apparatus 10 is shown in which a plurality of reallocators is arranged in a hierarchical tree. In the illustrated example, a system level reallocator 12 is communicatively coupled to one or more intermediate levels of reallocators 14, which in turn may be communicatively coupled to one or more node level reallocators 16 (16a-16c). Additionally, the illustrated node level reallocators 16 are communicatively coupled to one or more processor level reallocators 18 (18a-18c). In general, each processor level reallocator 18 may be associated with a plurality of application threads (e.g., executing on one or more processor cores, not shown) that form, constitute and/or define a compute subtree for the processor level reallocator 18 in question. For example, a first processor level reallocator 18a might be associated with a first plurality of application threads executing on one or more processor cores, wherein the first plurality of application threads form a first compute subtree for the first processor level reallocator 18a. Similarly, a second processor level reallocator 18b may be associated with a second plurality of threads that form a second compute subtree, a third processor level reallocator 18c may be associated with a third plurality of threads that form a third compute subtree, and so forth.

Moreover, each node level reallocator 16 may be associated with a plurality of processor level reallocators that form, constitute and/or define a compute subtree. For example, the first processor level reallocator 18a, the second processor level reallocator 18b and the third processor level reallocator 18c may form a compute subtree for a first node level reallocator 16a. The node level reallocators 16 may form one or more compute subtrees for the intermediate levels of reallocators 14 and the intermediate levels of reallocators 14 may form a compute subtree for the system level reallocator 12.

In the illustrated example, the system level reallocator 12 receives resource budget information 20 that indicates, for example, the amount of power, voltage and/or frequency credits that are available to be distributed across the reallocation apparatus 10. The resource budget information 20 may be obtained in a variety of different ways. For example, the resource budget information 20 might be supplied at job launch time and potentially changed at job run time by a system resource manager. In another example, the resource budget information 20 is a static default that is configured by an administrator and gets supplied anytime a new job launches. Moreover, the resource budget information 20 might be supplied by the user at job launch time (e.g., directly or indirectly through qualitative settings such as, for example, "low," "medium," or "high"), and so forth.

Leveraging the resource budget information 20 at the system level reallocator 12 may enhance the scalability of the reallocation apparatus 10. For example, a performance imbalance between the compute subtree associated with the first node level reallocator 16a and the compute subtree associated with a second node level reallocator 16a might be mitigated by allocating different amounts of the resource budget to the first node level reallocator 16a than to the second node level reallocator 16b (e.g., rather than indiscriminately allocating equal amounts regardless of the performance imbalance). Moreover, the imbalance mitigation may take place at any or all levels of the hierarchical tree.

Accordingly, as the number of processor level reallocators 18 grows (e.g., due to an increase in system scale), reallocation decisions may be made at different levels of the hierarchical tree and by several reallocators, rather than a single, centralized reallocator for the entire reallocation apparatus 10.

Figure 2:
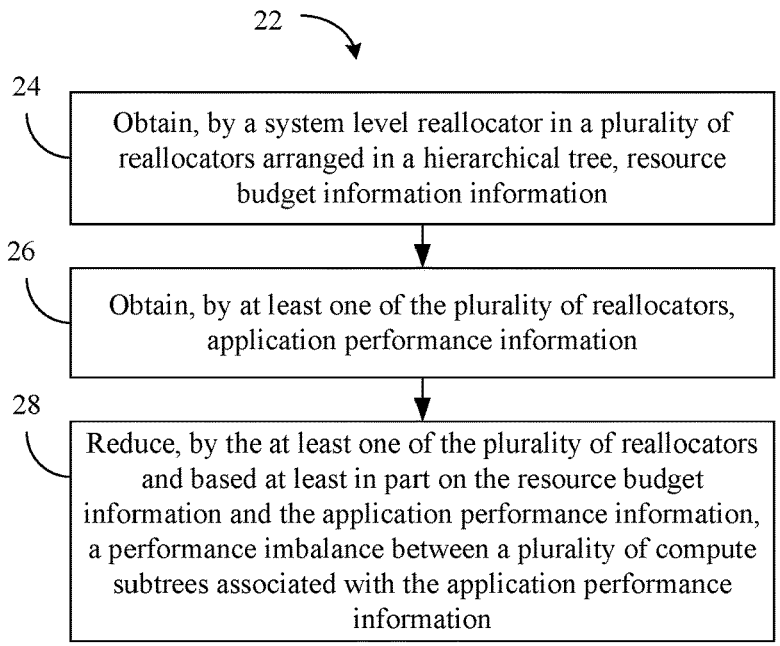
FIG. 2 is a flowchart of an example of a method of mitigating performance imbalances according to an embodiment.

FIG. 2 shows a method 22 of mitigating performance imbalances. The method 22 may generally be implemented in a reallocation apparatus such as, for example, the reallocation apparatus 10 (FIG. 12), already discussed. More particularly, the method 22 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 22 may be written in any combination of one or more programming languages, including an object oriented programming language such as JAVA, SMALLTALK, C++ or the like and conventional procedural programming languages, such as the "C" programming language or similar programming languages.

Illustrated processing block 24 provides for obtaining, by a system level reallocator in a plurality of reallocators arranged in a hierarchical tree, resource budget information. As already noted, the resource budget information may be, for example, supplied at job launch time and potentially changed at job run time by a system resource manager, a static default that is configured by an administrator and gets supplied anytime a new job launches, supplied by the user at job launch time through qualitative settings, and so forth. Additionally, block 26 may obtain, by at least one of the plurality of reallocators, application performance information. As will be discussed in greater detail, the application performance information may be associated with the progress toward an end of a workload phase, the floating point operations (FLOPS) rate, the number of completed memory operations, and so forth, on a per compute subtree basis. Thus, if the reallocator is a system level reallocator such as, for example, the system level reallocator 12 (FIG. 1), the application performance information may be received on a per intermediate level reallocator basis. If, on the other hand, the reallocator is an intermediate level reallocator, the application performance information may be received on a per node level reallocator basis. Similarly, if the reallocator is a node level reallocator, the application performance information may be received on a per processor level reallocator basis, and if the reallocator is a processor level reallocator, the application performance information may be received on a per thread basis. Moreover, the application performance information may be associated with a minimum value and/or an average value, depending on the circumstances.

Illustrated block 28 reduces, by the at least one of the plurality of reallocators and based at least in part on the resource budget information and the application performance information, a performance imbalance between a plurality of compute subtrees associated with the application performance information. For example, if the reallocator is a node level reallocator, block 28 may reduce, mitigate or otherwise correct a performance imbalance between a plurality processor level reallocators communicatively coupled to the node level reallocator.

Figure 3:
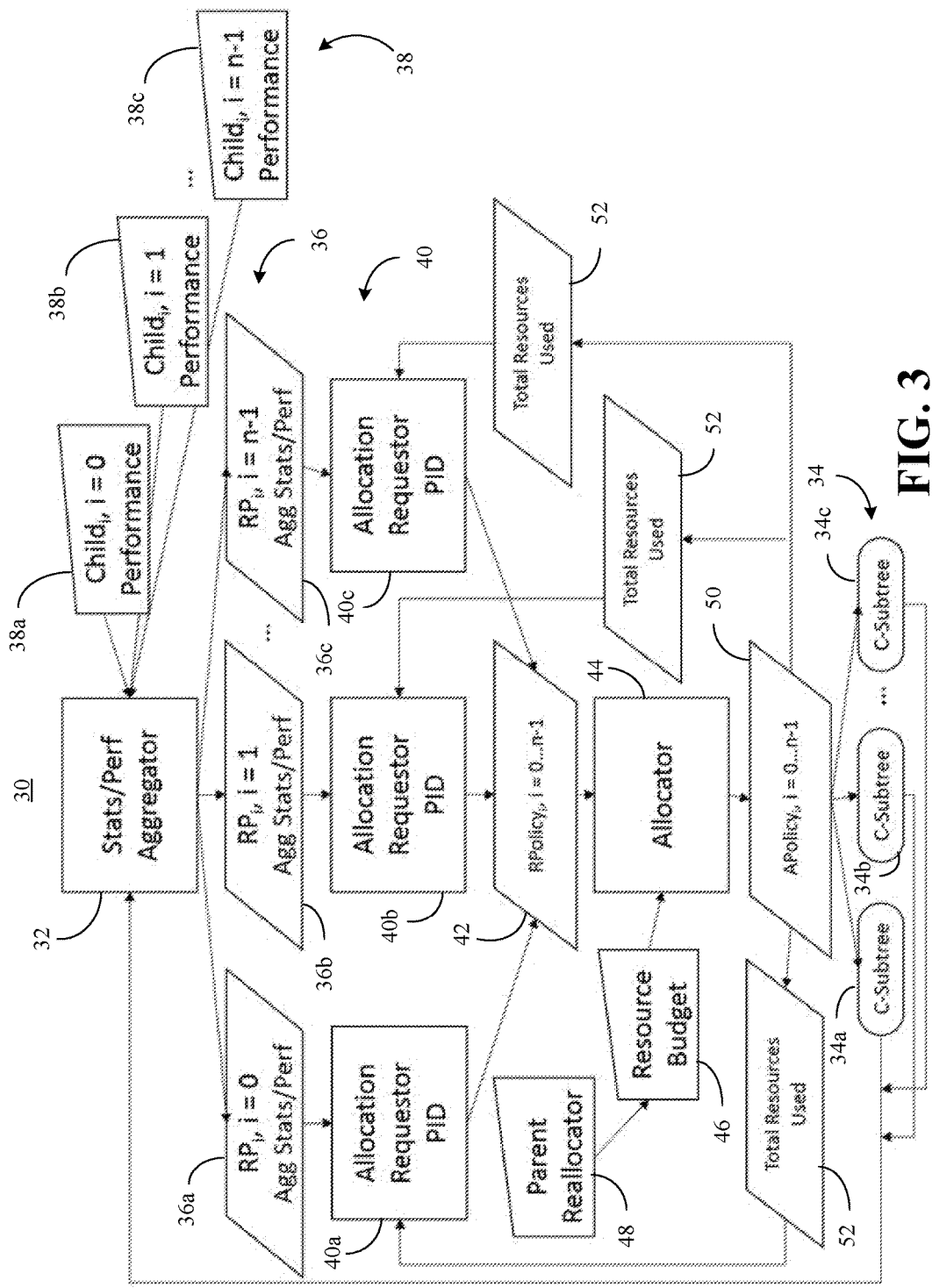
FIG. 3 is a block diagram of an example of a reallocator according to an embodiment.

FIG. 3 shows a reallocator 30 that may generally include logic instructions, configurable logic, fixed-functionality logic hardware, etc., or any combination thereof. The reallocator 30 may be substituted for one or more of the plurality reallocators in a reallocation apparatus such as, for example, the reallocation apparatus 10 (FIG. 1), already discussed. In the illustrated example, the reallocator 30 includes a statistical and/or performance aggregator 32 to generate, for each of a plurality of compute subtrees 34 (34a-34c, "C-Subtrees") a performance value 36 (36a-36c, "$RP_i$") based on application performance information 38 (38a-38c). The performance values 36 may represent the progress toward an end of a workload phase, the FLOPS rate, the number of completed memory operations, etc., or any combination thereof, on a per compute subtree basis. Additionally, the performance value 36 may include minimum values, average values, maximum values, standard deviations and/or weighted averages.

The illustrated reallocator 30 also includes a plurality of allocation requestors 40 (40a-40c) to generate a set of requests 42 ("$RPolicy_i$") based on the performance values 36. In one example, the allocation requestors 40 are distributed and use a proportional-integral-derivative (PID) controller to generate the set of requests 42. In general, a PID controller may be a control loop feedback mechanism that continuously calculates an error value as the difference between a measured process variable and a particular setpoint. Moreover, the set of requests 42 may identify frequency credits, power credits, an abstract priority (e.g., to be interpreted), and so forth. Additionally, an allocator 44 may assign one or more resources (e.g., frequency and/or power credits) to the plurality of compute subtrees 34 based on the set of requests 42 and a resource budget obtained from a parent reallocator 48. The assignment of resources may be specified and/or reflected in a set of assignments 50 ("$APolicy_i$") and sent to the compute subtrees 34. The set of assignments 50 may also be used to generate a report 52 of total resources used, which may be sent to the requestors 40 and the aggregator 32 as feedback. The requestors 40 and the aggregator 32 may therefore use the report 52 when generating future sets of requests 42 and performance values 36, respectively.

Thus, during the execution of each compute subtree 34, the aggregator 32 may regularly re-compute statistics and performance metrics in order to identify the compute subtrees 34 that are further ahead in the computation and those that have fallen behind. In one embodiment, a performance metric is based on the amount of work that each compute subtree 34 has completed relative to the total amount of work to be completed before the beginning of the next workload phase. Since different compute subtrees 34 may be assigned different total amounts of work (e.g., when the application work doesn't partition evenly among processors), the performance of each compute subtree 34 may be computed in relative terms:

$$RP_i = \frac{\text{Total Work Completed on Compute Subtree } i}{\text{Total Work Assigned to Compute Subtree } i}$$

The $RP_i$ and application performance information (e.g., Agg/Stats Performance) may be used by the distributed requestor 40 (e.g., PID controller) to request a resource allocation (RPolicy$_i$) for each compute subtree 34, wherein the requested resource allocation minimizes the error between RP$_i$ and the overall application performance (e.g., global performance information across all subtrees). The requested resource allocation may be correlated to the imbalance across the compute subtrees 34. In other words, the requestor 40 may request a larger allocation for a compute subtree 34 with low performance and request a smaller allocation for a compute subtree 34 with high performance.

The output produced by the distributed requestor 40 may be modified by some offset, which is equivalent to the target power or performance usage for the compute subtree 34. In order to achieve coordination across the distributed requestor 40, the aggregate of the set of assignments 50 may be set to converge to some target value such as, for example, the resource budget 46 obtained from the parent reallocator 48. In this case, a larger allocation assigned to one subtree 34 results in a smaller allocation to another subtree 34, so that the system remains balanced. The coordination problem may be solved by defining the error function so that it ties together the compute subtrees 34 using their relative performance. For each requestor, i, the error may be calculated as follows:

$$e_i = 1 - \frac{RP_i}{Agg \ Stats/Performance}$$

As an example, the error function may be defined so that the total across all compute subtrees 34 adds to zero, which causes the RPolicy for a given subtree to be constrained by the offset. In other words, if there are n compute subtrees, then the aggregate error is defined as:

$$e_{agg} = \sum_{i=1}^{n} e_i = \sum_{i=1}^{n} 1 - \frac{RP_i}{AvgRP} = 0$$

The above expression may be proven as true by applying summation rules:

$$e_{agg} = \sum_{i=1}^{n} 1 - \frac{RP_i}{AvgRP} = \sum_{i=1}^{n} 1 - \sum_{i=1}^{n} \frac{RP_i}{AvgRP} = n - \sum_{i=1}^{n} \frac{RP_i}{\frac{\sum_{i=1}^{n} RP_i}{n}}$$

$$e_{agg} = n - \frac{n}{\frac{n(n+1)}{2}} \sum_{i=1}^{n} RP_i = n - \left( \frac{2n}{n(n+1)} * \frac{n(n+1)}{2} \right) = n - n = 0$$

Because the aggregate sum of the error across all subtrees 34 is zero, the aggregate of the outputs from the distributed requestor 40 at a given time will equal the sum of the offsets. This particular error function may enable the distributed requestor 40 to reallocate power and performance resources that are within the budget of the parent, and more importantly, will result in maximum performance benefit to the application.

As already noted, the allocator 44 may be responsible for assigning resources to the compute subtrees 34 based on the set of requests 42, but ensures that the total allocation does not exceed the total resource budget. In some embodiments, the allocator 44 may have additional duties. For example, the allocator 44 may map a continuous resource allocation request to the discrete set of values supported by the processor. Additionally, the allocator 44 may implement one or more additional PID controllers to enforce requests for resource allocations of one type by managing allocations of another type of resource. For example, a request for a power allocation may be enforced by managing the allocation of frequency credits using a PD.

Figure 4:
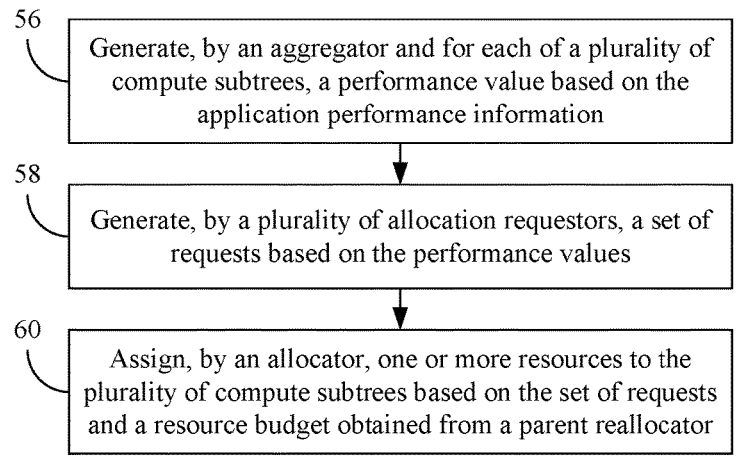
FIG. 4 is a flowchart of an example of a method of operating a reallocator according to an embodiment.

FIG. 4 shows a method 54 of operating a reallocator. The method 54 may generally be implemented in a reallocator such as, for example, the reallocator 30 (FIG. 3), already discussed. More particularly, the method 54 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs), in fixed-functionality logic hardware using circuit technology such as, for example, ASIC, CMOS or TTL technology, or any combination thereof.

Illustrated processing block 56 provides for generating, by an aggregator and for each of a plurality of compute subtrees, a performance value based on application performance information. Additionally, block 58 may generate, by a plurality of application requestors, a set of requests based on the performance values. In one example, each performance value represents one or more of a progress toward an end of a workload phase, a FLOP rate or a number of completed memory operations. Block 60 provides for assigning, by an allocator, one or more resources to the plurality of compute subtrees based on the set of requests and a resource budget obtained from a parent reallocator in the hierarchical tree.

Block 60 may also include controlling, by the allocator, a convergence of the assigned one or more resources toward the resource budget. Additionally, block 60 may provide for mapping, by the allocator, a continuous attribute of the set of requests to a discrete attribute of the assigned one or more resources. For example, a request to operate at a particular frequency falling between two discrete frequency values may be mapped to a closer value of the two discrete frequency values. Similarly, a request to operate at a particular voltage falling between two discrete voltage values may be mapped to a closer value of the two discrete voltage values. Moreover, block 60 may include translating, by the allocator, a request type associated with the set of requests to a resource type associated with the assigned one or more resources. For example, a request for a power allocation might be translated into a frequency credit.

Figure 5:
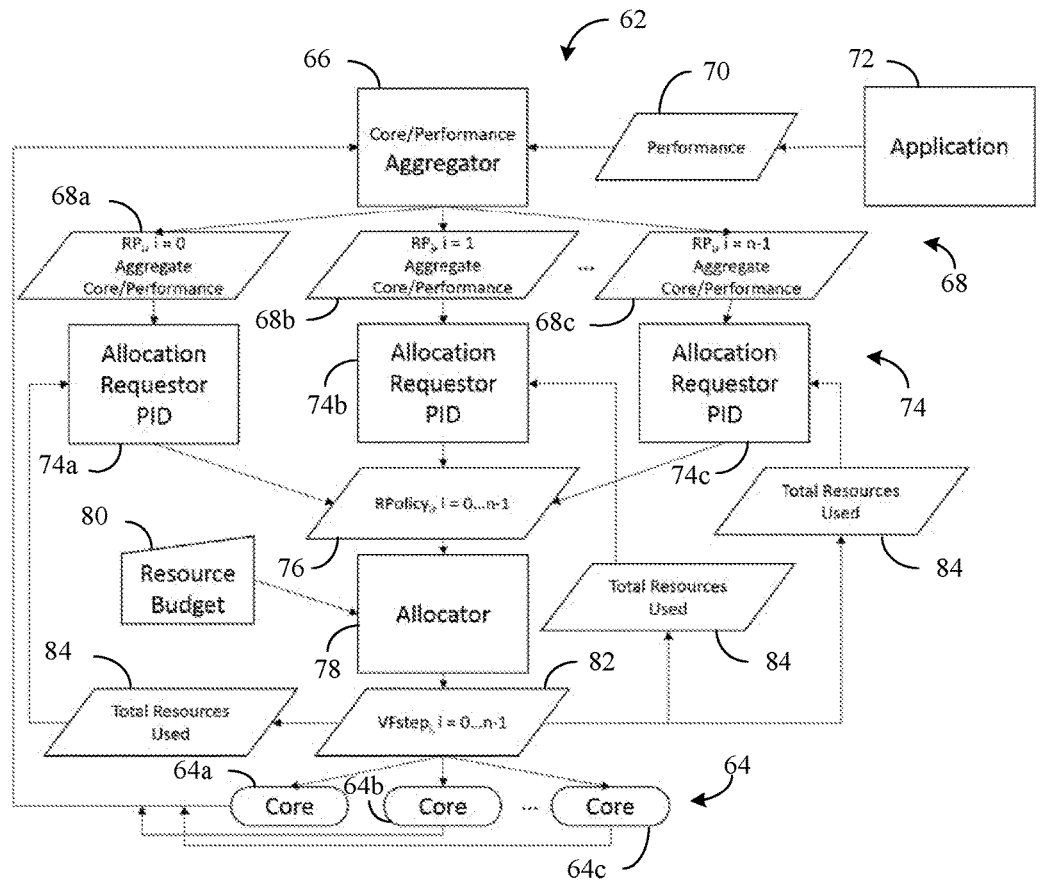
FIG. 5 is a block diagram of an example of a reallocator that controls voltage and frequency settings according to an embodiment.

FIG. 5 shows a reallocator 62 that controls voltage and frequency settings for a plurality of cores 64 (64a-64c) that form a compute subtree for the reallocator 62. The reallocator 62, which may generally include logic instructions, configurable logic and/or fixed-functionality logic hardware, may implement one or more aspects of the method 54 (FIG. 4), already discussed. In addition, the reallocator 62 may be substituted for one or more of the processor level reallocators 18 (FIG. 1), already discussed. In the illustrated example, the reallocator 62 includes a core and/or performance aggregator 66 to generate, for each of a plurality of threads executing on the cores 64, a performance value 68 (68a-68c) based on performance information 70 from an application 72. The application 72 may invoke or be otherwise associated with the plurality of threads executing on the cores 64. The performance values 68 may therefore represent the progress toward an end of a workload phase, the FLOPS rate, the number of completed memory operations, etc., or any combination thereof, on a per thread (e.g., compute subtree) basis. Additionally, the performance values 68 may include minimum values and/or average values.

The illustrated reallocator 62 also includes a plurality of allocation requestors 74 (74a-74c) to generate a set of requests 76 ("RPolicy$_i$") based on the performance values 68. In one example, the allocation requestors 40 use a PID to generate the set of requests 76. The set of requests 76 may identify frequency credits, power credits, an abstract priority (e.g., to be interpreted), and so forth. Additionally, an allocator 78 may assign one or more resources (e.g., frequency and/or power credits) to the plurality of threads running on the cores 64 based on the set of requests 42 and a resource budget 80 (e.g., obtained from a parent reallocator in the hierarchical tree). The assignment of resources may be specified and/or reflected in a set of step assignments 82 ("VFstep$_i$") and sent to the cores 64. Each step assignment 82 may specify a discrete voltage-frequency operational level. The set of assignments 82 may also be used to generate a report 84 of total resources used, which may be sent to the requestors 74 and the aggregator 66 as feedback. The requestors 74 and the aggregator 66 may therefore use the report 84 when generating future sets of requests 76 and performance values 68, respectively.

Figure 6:
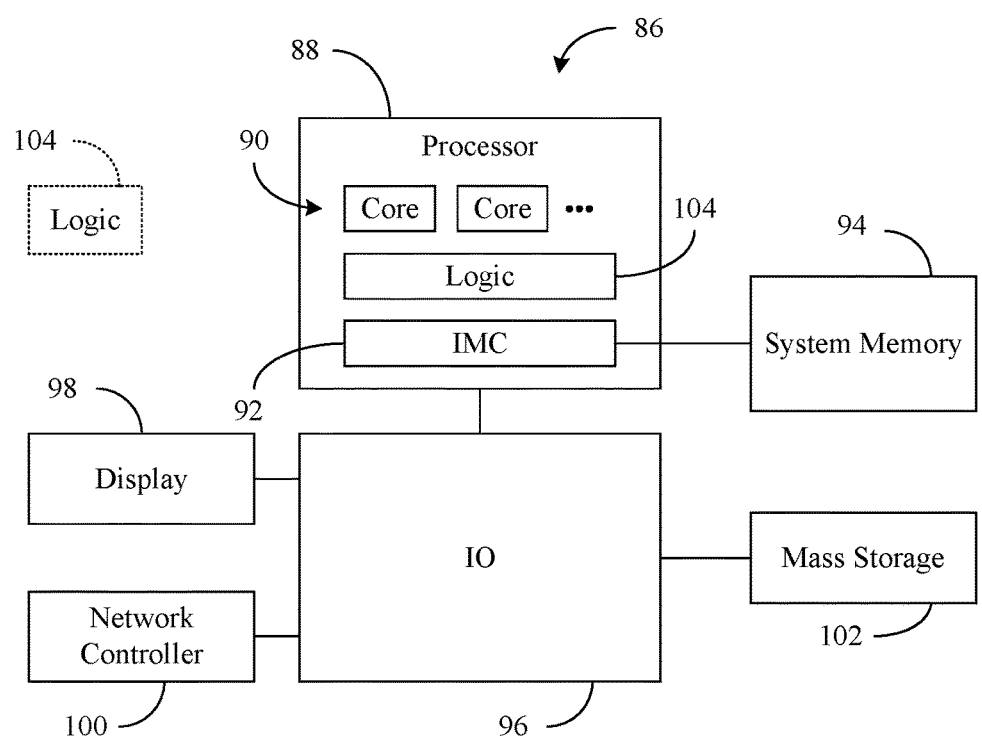
FIG. 6 is an illustration of an example of a computing system according to an embodiment.

FIG. 6 shows a computing system 86. The computing system 86 may be part of an electronic device/platform having computing functionality (e.g., personal digital assistant/PDA, notebook computer, tablet computer, convertible tablet, server, HPC system), communications functionality (e.g., wireless smart phone), imaging functionality, media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 86 includes a processor 88 having a plurality of cores 90 to execute an application and an integrated memory controller (IMC) 92, which may communicate with system memory 94. The system memory 94 may include, for example, dynamic random access memory (DRAM) configured as one or more memory modules such as, for example, dual inline memory modules (DIMMs), small outline DIMMs (SODIMMs), etc.

The illustrated system 86 also includes an input output (10) module 96 implemented together with the processor 88 on a semiconductor die (not shown) as a system on chip (SoC), wherein the IO module 96 functions as a host device and may communicate with, for example, a display 98 (e.g., touch screen, liquid crystal display/LCD, light emitting diode/LED display), a network controller 100, and mass storage 102 (e.g., hard disk drive/HDD, optical disk, flash memory, etc.). The illustrated processor 88 may execute logic 104 that obtains, by a system level reallocator in a plurality of reallocators arranged in a hierarchical tree, resource budget information. The logic 104 may also obtain, by at least one of the plurality of reallocators, application performance information. In addition, the logic 104 may reduce, by the at least one of the plurality of reallocators and based at least in part on the resource budget information and the application performance information, a performance imbalance between a plurality of compute subtrees associated with the application performance information. Thus, the logic 104 may implement one or more aspects of the method 22 (FIG. 2) and/or the method 54 (FIG. 4) and may function similarly to the reallocation apparatus 10 (FIG. 1). The logic 104 may alternatively be implemented elsewhere in the system 86. Additionally, the display 98 may visually present result information associated with execution of the application.

Additional Notes and Examples

Example 1 may include a high performance computing system comprising a plurality of cores to execute an application, a plurality of reallocators arranged in a hierarchical tree, the plurality of reallocators including a system level reallocator to obtain resource budget information, wherein at least one of the plurality of reallocators is to obtain application performance information and reduce, based at least in part on the resource budget information and the application performance information, a performance imbalance between a plurality of compute subtrees associated with the application performance information, and a display to visually present result information associated with execution of the application.

Example 2 may include the system of Example 1, wherein the at least one of the plurality of reallocators includes an aggregator to generate, for each of the plurality of compute subtrees, a performance value based on the application performance information, a plurality of allocation requestors to generate a set of requests based on the performance values, and an allocator to assign one or more resources to the plurality of compute subtrees based on the set of requests and a resource budget obtained from a parent reallocator in the hierarchical tree.

Example 3 may include the system of Example 2, wherein the performance value represents one or more of a progress toward an end of a workload phase, a floating point operations rate or a number of completed memory operations.

Example 4 may include the system of Example 2, wherein the allocator is to control a convergence of the assigned one or more resources toward the resource budget.

Example 5 may include the system of Example 2, wherein the allocator is to map a continuous attribute of the set of requests to a discrete attribute of the assigned one or more resources.

Example 6 may include the system of Example 2, wherein the allocator is to translate a request type associated with the set of requests to a resource type associated with the assigned one or more resources.

Example 7 may include the system of any one of Examples 1 to 6, wherein the plurality of reallocators includes one or more processor level reallocators, wherein each processor level reallocator is associated with a plurality of application threads that form a compute subtree, and one or more node level reallocators, wherein each node level reallocator is associated with a plurality of processor level reallocators that form a compute subtree.

Example 8 may include a reallocation apparatus comprising a plurality of reallocators arranged in a hierarchical tree, the plurality of reallocators including a system level reallocator to obtain resource budget information, wherein at least one of the plurality of reallocators is to obtain application performance information and reduce, based at least in part on the resource budget information and the application performance information, a performance imbalance between a plurality of compute subtrees associated with the application performance information.

Example 9 may include the apparatus of Example 8, wherein the at least one of the plurality of reallocators includes an aggregator to generate, for each of the plurality of compute subtrees, a performance value based on the application performance information, a plurality of allocation requestors to generate a set of requests based on the performance values, and an allocator to assign one or more resources to the plurality of compute subtrees based on the set of requests and a resource budget obtained from a parent reallocator in the hierarchical tree.

Example 10 may include the apparatus of Example 9, wherein the performance value represents one or more of a progress toward an end of a workload phase, a floating point operations rate or a number of completed memory operation.

Example 11 may include the apparatus of Example 9, wherein the allocator is to control a convergence of the assigned one or more resources toward the resource budget.

Example 12 may include the apparatus of Example 9, wherein the allocator is to map a continuous attribute of the set of requests to a discrete attribute of the assigned one or more resources.

Example 13 may include the apparatus of Example 9, wherein the allocator is to translate a request type associated with the set of requests to a resource type associated with the assigned one or more resources.

Example 14 may include the apparatus of any one of Examples 8 to 13, wherein the plurality of reallocators includes one or more processor level reallocators, wherein each processor level reallocator is associated with a plurality of application threads that form a compute subtree, and one or more node level reallocators, wherein each node level reallocator is associated with a plurality of processor level reallocators that form a compute subtree.

Example 15 may include a method of operating a reallocation apparatus, comprising obtaining, by a system level reallocator in a plurality of reallocators arranged in a hierarchical tree, resource budget information, obtaining, by at least one of the plurality of reallocators, application performance information and reducing, by the at least one of the plurality of reallocators and based at least in part on the resource budget information and the application performance information, a performance imbalance between a plurality of compute subtrees associated with the application performance information.

Example 16 may include the method of Example 15, further including generating, by an aggregator and for each of the plurality of compute subtrees, a performance value based on the application performance information, generating, by a plurality of allocation requestors, a set of requests based on the performance values, and assigning, by an allocator, one or more resources to the plurality of compute subtrees based on the set of requests and a resource budget obtained from a parent reallocator in the hierarchical tree.

Example 17 may include the method of Example 16, wherein the performance value represents one or more of a progress toward an end of a workload phase, a floating point operations rate or a number of completed memory operations.

Example 18 may include the method of Example 16, further including controlling, by the allocator, a convergence of the assigned one or more resources toward the resource budget.

Example 19 may include the method of any one of Examples 15 to 18, further including mapping, by the allocator, a continuous attribute of the set of requests to a discrete attribute of the assigned one or more resources, and translating, by the allocator, a request type associated with the set of requests to a resource type associated with the assigned one or more resources.

Example 20 may include at least one computer readable storage medium comprising a set of instructions, which when executed by a computing device, cause the computing device to obtain, by a system level reallocator in a plurality of reallocators arranged in a hierarchical tree, resource budget information, obtain, by at least one of the plurality of reallocators, application performance information and reduce, by the at least one of the plurality of reallocators and based at least in part on the resource budget information and the application performance information, a performance imbalance between a plurality of compute subtrees associated with the application performance information.

Example 21 may include the at least one computer readable storage medium of Example 20, wherein the instructions, when executed, cause a computing device to generate, by an aggregator and for each of the plurality of compute subtrees, a performance value based on the application performance information, generate, by a plurality of allocation requestors, a set of requests based on the performance values, and assign, by an allocator, one or more resources to the plurality of compute subtrees based on the set of requests and a resource budget obtained from a parent reallocator in the hierarchical tree.

Example 22 may include the at least one computer readable storage medium of Example 21, wherein the performance value represents one or more of a progress toward an end of a workload phase, a floating point operations rate or a number of completed memory operations.

Example 23 may include the at least one computer readable storage medium of Example 21, wherein the instructions, when executed, cause a computing device to control, by the allocator, a convergence of the assigned one or more resources toward the resource budget.

Example 24 may include the at least one computer readable storage medium of any one of Examples 20 to 23, wherein the instructions, when executed, cause a computing device to map, by the allocator, a continuous attribute of the set of requests to a discrete attribute of the assigned one or more resources, and translate, by the allocator, a request type associated with the set of requests to a resource type associated with the assigned one or more resources.

Example 25 may include a reallocation apparatus comprising means for obtaining, by a system level reallocator in a plurality of reallocators arranged in a hierarchical tree, resource budget information, means for obtaining, by at least one of the plurality of reallocators, application performance information, and means for reducing, by the at least one of the plurality of reallocators and based at least in part on the resource budget information and the application performance information, a performance imbalance between a plurality of compute subtrees associated with the application performance information.

Example 26 may include the apparatus of Example 25, further including means for generating, by an aggregator and for each of the plurality of compute subtrees, a performance value based on the application performance information, means for generating, by a plurality of allocation requestors, a set of requests based on the performance values, and means for assigning, by an allocator, one or more resources to the plurality of compute subtrees based on the set of requests and a resource budget obtained from a parent reallocator in the hierarchical tree.

Example 27 may include the apparatus of Example 26, wherein the performance value is to represent one or more of a progress toward an end of a workload phase, a floating point operations rate or a number of completed memory operations.

Example 28 may include the apparatus of Example 26, further including means for controlling, by the allocator, a convergence of the assigned one or more resources toward the resource budget.

Example 29 may include the apparatus of any one of Examples 25 to 28, further including means for mapping, by the allocator, a continuous attribute of the set of requests to a discrete attribute of the assigned one or more resources, and means for translating, by the allocator, a request type associated with the set of requests to a resource type associated with the assigned one or more resources.

Techniques described herein may therefore employ an aggregator that collects information not only from the cores but also performance information from the application. Such an approach may enable the solution to comprehend and correct load imbalances through more informed reallocation decisions. Moreover, techniques may employ many parallel allocation requestors in each reallocation apparatus/agent instead of a single centralized allocation requestor. As a result, scalability may be greatly improved for future processors with, for example, hundreds of cores. Additionally, techniques described herein may coordinate the parallel/distributed requestors in each reallocation agent so that the design converges more swiftly on optimal resource allocations.

Moreover, conventional power-performance management systems may have lacked awareness of application global synchronization patterns and the performance degradation induced by load imbalance. In addition, the heuristics that they employ may tend to aggravate rather than mitigate load imbalance. Through application-awareness, techniques described herein may produce substantially better results.

Additionally, conventional load imbalance mitigation solutions may employ resource reallocation strategies with scaling bottlenecks that might limit their feasibility as system scales increase—especially with respect to the number of cores per processor. Through a highly scalable design, techniques described herein may be feasible in large systems where other designs fail.

Indeed, even for systems of moderate scale, conventional power-performance management systems that have attempted to mitigate load imbalance may have employed resource reallocation strategies that either suffered slow imbalance correction times or traded effectiveness for faster correction times. Through a novel reallocation algorithm based on coordinated parallel PID controllers, techniques described herein may mitigate load imbalance more swiftly and effectively for maximum application benefit.

Moreover, at the processor level, conventional power-performance management designs may employ a Power Control Unit (PCU) or equivalent. The PCU may be a hardware unit in the processor whose responsibilities include but are not limited to: managing the allocation of limited processor power resources among processor subcomponents and selecting the voltage/frequency setting (i.e. $VF_{step}$) that each core will run at. A major limitation of the PCU is that it may lack awareness of application global synchronization patterns and feedback from the application about load imbalance. Instead, the PCU may rely on simple information to determine what voltage/frequency to operate the cores at. Since the PCU employs a centralized design that does not scale well with increasing core counts—another major limitation of the PCU—it may sacrifice quality in its power management decisions in order to reduce decision complexity. For example, the PCU might apply the same voltage/frequency to all cores even though modern processors contain mechanisms enabling finer-grained configuration of voltage/frequency, in principle. Techniques described herein may replace the PCU-based design with a design that is application-aware, scalable, and fast-converging.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a plurality of cores to execute an application;
a plurality of reallocators, implemented at least partly in one or more of configurable logic or fixed-functionality logic hardware, arranged in a hierarchical tree, the plurality of reallocators including a system level reallocator, implemented at least partly in one or more of configurable logic or fixed-functionality logic hardware, to obtain resource budget information, wherein at least one of the plurality of reallocators, implemented at least partly in one or more of configurable logic or fixed-functionality logic hardware, is to obtain application performance information and includes an aggregator, implemented at least partly in one or more of configurable logic or fixed-functionality logic hardware, to generate, for each respective compute subtree of a plurality of compute subtrees, a performance value based on the application performance information, wherein each of the performance values is to represent one or more of a floating point operations rate of the respective compute subtree, a number of completed memory operations of the respective compute subtree or a progress toward an end of a workload phase that is based on completed work of the respective compute subtree relative to assigned work of the respective compute subtree, further wherein the at least one of the plurality of reallocators is to reduce, based at least in part on the resource budget information and the performance values, a performance imbalance between the plurality of compute subtrees by a determination of node resource budget information, and further wherein the plurality of reallocators includes:

a plurality of processor level reallocators, implemented at least partly in one or more of configurable logic or fixed-functionality logic hardware, wherein each respective processor level reallocator of the processor level reallocators is to reduce, based at least in part on processor resource budget information, a performance imbalance between application threads associated with the respective processor level reallocator; and a node level reallocator, implemented at least partly in one or more of configurable logic or fixed-functionality logic hardware, to reduce based at least in part on the node resource budget information, a performance imbalance between the processor level reallocators by a determination of the processor resource budget information of the processor level reallocators; and a display to visually present result information associated with execution of the application.

2. The system of claim 1, wherein the at least one of the plurality of reallocators includes:

a plurality of allocation requestors, implemented at least partly in one or more of configurable logic or fixed-functionality logic hardware, to generate a set of requests based on the performance values; and an allocator, implemented at least partly in one or more of configurable logic or fixed-functionality logic hardware, to assign one or more resources to the plurality of compute subtrees based on the set of requests and a resource budget obtained from a parent reallocator in the hierarchical tree.

3. The system of claim 2, wherein the allocator is to control a convergence of the assigned one or more resources toward the resource budget.

4. The system of claim 2, wherein the allocator is to map a continuous attribute of the set of requests to a discrete attribute of the assigned one or more resources.

5. The system of claim 2, wherein the allocator is to translate a request type associated with the set of requests to a resource type associated with the assigned one or more resources.

6. The system of claim 1, wherein each respective processor level reallocator of the processor level reallocators is to:

receive the processor resource budget information from the node level reallocator that is a parent reallocator of the processor level reallocator, and reduce, based at least in part on application performance information associated with the application threads that are associated with the respective processor level reallocator, the performance imbalance between the application threads that are associated with the respective processor level reallocator; and wherein the node level reallocator is to reduce based at least in part on application performance information associated with the plurality of the processor level reallocators, the performance imbalance between the plurality of the processor level reallocators.

7. The system of claim 1, wherein the at least one of the plurality of reallocators is to reduce, based at least in part on the resource budget information and the performance values, the performance imbalance between the plurality of compute subtrees before any of the compute subtrees reaches a next synchronization point associated with execution of the application.

8. The system of claim 6, wherein each processor level reallocator is to:

generate, for each respective application thread associated with the processor level reallocator and based on the application performance information associated with the application threads, a performance value that is to represent one or more of a floating point operations rate of the respective application thread, a number of completed memory operations of the application thread or a progress toward an end of a workload phase that is based on completed work of the application thread relative to assigned work of the application thread; and reduce the performance imbalance, between the application threads associated with the processor level reallocator, based on the performance values of the application threads associated with the processor level reallocator.

9. The system of claim 8, wherein the node level reallocator is to:

generate, for each processor level reallocator and based on the application performance information associated with the processor level reallocators, a performance value that is to represent one or more of a floating point operations rate of the processor level reallocator, a number of completed memory operations of the processor level reallocator or a progress toward an end of a workload phase that is based on completed work of the processor level reallocator relative to assigned work of the processor level reallocator; and reduce the performance imbalance, between the processor level reallocators, based on the performance values of the processor level reallocators.

10. The system of claim 1, wherein each of the performance values is to represent the progress toward the end of the workload phase that is based on the completed work of the respective compute subtree relative to the assigned work of the respective compute subtree.

11. An apparatus comprising:

a plurality of reallocators, implemented at least partly in one or more of configurable logic or fixed-functionality logic hardware, arranged in a hierarchical tree, the plurality of reallocators including a system level reallocator, implemented at least partly in one or more of configurable logic or fixed-functionality logic hardware, to obtain resource budget information, wherein at least one of the plurality of reallocators, implemented at least partly in one or more of configurable logic or fixed-functionality logic hardware, is to obtain application performance information and includes an aggregator, implemented at least partly in one or more of configurable logic or fixed-functionality logic hardware, to generate, for each respective compute subtree of a plurality of compute subtrees, a performance value based on the application performance information,
wherein each of the performance values is to represent one or more of a floating point operations rate of the respective compute subtree, a number of completed memory operations of the respective compute subtree or a progress toward an end of a workload phase that is based on completed work of the respective compute subtree relative to assigned work of the respective compute subtree, and
further wherein the at least one of the plurality of reallocators is to reduce, based at least in part on the resource budget information and the performance values, a performance imbalance between the plurality of compute subtrees by a determination of node resource budget information,
further wherein the plurality of reallocators includes:
a plurality of processor level reallocators, implemented at least partly in one or more of configurable logic or fixed-functionality logic hardware, wherein each respective processor level reallocator of the processor level reallocators is to reduce, based at least in part on processor resource budget information, a performance imbalance between application threads associated with the respective processor level reallocator; and
a node level reallocator, implemented at least partly in one or more of configurable logic or fixed-functionality logic hardware, to reduce based at least in part on the node resource budget information, a performance imbalance between the processor level reallocators by a determination of the processor resource budget information of the processor level reallocators.

12. The apparatus of claim 11, wherein the at least one of the plurality of reallocators includes:
a plurality of allocation requestors, implemented at least partly in one or more of configurable logic or fixed-functionality logic hardware, to generate a set of requests based on the performance values; and
an allocator, implemented at least partly in one or more of configurable logic or fixed-functionality logic hardware, to assign one or more resources to the plurality of compute subtrees based on the set of requests and a resource budget obtained from a parent reallocator in the hierarchical tree.

13. The apparatus of claim 12, wherein the allocator is to control a convergence of the assigned one or more resources toward the resource budget.

14. The apparatus of claim 12, wherein the allocator is to map a continuous attribute of the set of requests to a discrete attribute of the assigned one or more resources.

15. The apparatus of claim 12, wherein the allocator is to translate a request type associated with the set of requests to a resource type associated with the assigned one or more resources.

16. The apparatus of claim 11,
wherein each respective processor level reallocator of the processor level reallocators is to:
receive the processor resource budget information from the node level reallocator that is a parent reallocator of the processor level reallocator, and
reduce, based at least in part on application performance information associated with the application threads that are associated with the respective processor level reallocator, the performance imbalance between the application threads that are associated with the respective processor level reallocator; and
wherein the node level reallocator is to reduce based at least in part on application performance information associated with the plurality of the processor level reallocators, the performance imbalance between the plurality of the processor level reallocators.

17. A method comprising:
obtaining, by a system level reallocator in a plurality of reallocators arranged in a hierarchical tree, resource budget information, wherein the plurality of reallocators includes a plurality of processor level reallocators and a node level reallocator associated with the processor level reallocators;
obtaining, by at least one of the plurality of reallocators, application performance information;
generating, by an aggregator of the at least one of the plurality of reallocators and for each respective compute subtree of a plurality of compute subtrees, a performance value based on the application performance information, wherein each of the performance values is to represent one or more of a floating point operations rate of the respective compute subtree, a number of completed memory operations of the respective compute subtree or a progress toward an end of a workload phase that is based on completed work of the respective compute subtree relative to assigned work of the respective compute subtree;
reducing, by the at least one of the plurality of reallocators and based at least in part on the resource budget information and the performance values, a performance imbalance between the plurality of compute subtrees by determining node resource budget information;
reducing by each respective processor level reallocator of the processor level reallocators and based at least in part on processor resource budget information, a performance imbalance between application threads associated with the respective processor level reallocator; and
reducing by the node level reallocator and based at least in part on the node resource budget information, a performance imbalance between the processor level reallocators by determining the processor resource budget information of the processor level reallocators.

18. The method of claim 17, further including:
generating, by a plurality of allocation requestors, a set of requests based on the performance values; and
assigning, by an allocator, one or more resources to the plurality of compute subtrees based on the set of requests and a resource budget obtained from a parent reallocator in the hierarchical tree.

19. The method of claim 18, further including controlling, by the allocator, a convergence of the assigned one or more resources toward the resource budget.

20. The method of claim 18, further including:
mapping, by the allocator, a continuous attribute of the set of requests to a discrete attribute of the assigned one or more resources; and
translating, by the allocator, a request type associated with the set of requests to a resource type associated with the assigned one or more resources.

21. At least one non-transitory computer readable storage medium comprising a set of instructions, which when executed by a computing device, cause the computing device to:
obtain, by a system level reallocator in a plurality of reallocators arranged in a hierarchical tree, resource budget information, wherein the plurality of reallocators includes a plurality of processor level reallocators and a node level reallocator associated with the processor level reallocators;

obtain, by at least one of the plurality of reallocators, application performance information;

generate, by an aggregator of the at least one of the plurality of reallocators and for each respective compute subtree of a plurality of compute subtrees, a performance value based on the application performance information, wherein each of the performance values is to represent one or more of a floating point operations rate of the respective compute subtree, a number of completed memory operations of the respective compute subtree or a progress toward an end of a workload phase that is based on completed work of the respective compute subtree relative to assigned work of the respective compute subtree;

reduce, by the at least one of the plurality of reallocators and based at least in part on the resource budget information and the performance values, a performance imbalance between the plurality of compute subtrees by a determination of node resource budget information;

reduce by each respective processor level reallocator of the processor level reallocators and based at least in part on processor resource budget information, a performance imbalance between application threads associated with the respective processor level reallocator; and reduce by the node level reallocator and based at least in part on the node resource budget information, a performance imbalance between the processor level reallocators by a determination of the processor resource budget information of the processor level reallocators.

22. The at least one non-transitory computer readable storage medium of claim 21, wherein the instructions, when executed, cause a computing device to:

generate, by a plurality of allocation requestors, a set of requests based on the performance values; and assign, by an allocator, one or more resources to the plurality of compute subtrees based on the set of requests and a resource budget obtained from a parent reallocator in the hierarchical tree.

23. The at least one non-transitory computer readable storage medium of claim 22, wherein the instructions, when executed, cause a computing device to control, by the allocator, a convergence of the assigned one or more resources toward the resource budget.

24. The at least one non-transitory computer readable storage medium of claim 22, wherein the instructions, when executed, cause a computing device to:

map, by the allocator, a continuous attribute of the set of requests to a discrete attribute of the assigned one or more resources; and translate, by the allocator, a request type associated with the set of requests to a resource type associated with the assigned one or more resources.

* * * * *